United States Patent [19]
Kitajima et al.

[11] Patent Number: 4,521,355
[45] Date of Patent: Jun. 4, 1985

[54] METHOD OF PRODUCING CERAMIC WARE

[75] Inventors: Nobuyuki Kitajima, Tokyo; Yoshinori Tachibana, Kawagoe; Asashi Muraki; Shinichi Kuzuoka, both of Yokohama, all of Japan

[73] Assignee: Toppan Printing Company, Ltd., Tokyo, Japan

[21] Appl. No.: 533,882

[22] Filed: Sep. 19, 1983

Related U.S. Application Data

[63] Continuation of Ser. No. 397,835, Jul. 13, 1982, abandoned.

[30] Foreign Application Priority Data

Jul. 29, 1981 [JP] Japan ................... 56-118618

[51] Int. Cl.$^3$ .............................................. C04B 33/34
[52] U.S. Cl. ........................................ 264/60; 264/67; 264/86
[58] Field of Search ................... 264/63, 86, 67, 60

[56] References Cited

U.S. PATENT DOCUMENTS

| 3,540,894 | 11/1970 | McIntosh | 264/61 |
| 3,812,229 | 5/1974 | Anderson | 264/86 |
| 3,899,555 | 8/1975 | Takao | 264/86 |
| 4,313,900 | 2/1982 | Gonzales | 264/60 |

Primary Examiner—John A. Parrish
Attorney, Agent, or Firm—Bacon & Thomas

[57] ABSTRACT

A method of producing decorative ceramic ware is disclosed. In the first step, a flocculant is added to an aqueous suspension containing as main solid components a fibrous material and a ceramic raw material clay, followed by preparing ceramic raw material sheets from the suspension by the ordinary paper-making method. Prepared are at least two kinds of ceramic raw material sheets differing from each other in color after firing. Then, the stacking-cutting operation of the sheets is performed at least once, in which the different kinds of sheets are alternately stacked, followed by cutting the stacked mass in a direction not parallel with the surface of the raw material sheet. The cut piece is formed into the desired shape and, then, dried and fired to produce a striped or checkered decorative ceramic ware. This particular method permits industrial production of ceramic ware.

11 Claims, 3 Drawing Figures

METHOD OF PRODUCING CERAMIC WARE

This is a continuation of application Ser. No. 397,835, filed July 13, 1982, now abandoned.

BACKGROUND OF THE INVENTION

This invention relates to a method of producing ceramic ware by "Nerikomi" shaping (also called Neriagede, Uzurade, Momikomi). Nerikomi is a soft mud process, formerly restricted to expensive craftwork, which permits Nerikomi ceramic ware to be produced only by highly skilled craftsmen.

The Nerikomi shaping process comprises the steps of stacking alternately a plurality of clay boards differing from each other in color after firing, cutting the stacked mass in a direction not parallel with the surface of the clay board so as to obtain a striped new clay board, forming the striped clay board into a desired shape, e.g., shape of a vessel, and firing the shaped material to obtain a desired ceramic ware. The stacking and cutting of the clay boards may be repeated as required, e.g., the striped clay boards may be stacked again one upon the other, followed by cutting the stacked mass in a direction not parallel with the clay board surface, to obtain a clay board with a complex stripe pattern or checker pattern. This shaping process permits the raw material clay board itself to have a highly decorative pattern.

In general, the fineness of the pattern of the ceramic ware produced by the Nerikomi shaping process is determined by the thickness of the clay board. Also, the size of the ceramic ware is determined by the size of the clay board and the height of the stacked mass of the clay boards. Since there is a limit to the height of the clay boards, the size of the ceramic ware is substantially determined.

It was customary to prepare the clay board by the so-called "string-cut" technique in which a clay board is cut out of a kneaded clay board (tatara-ita) using a stretched string. However, it is difficult to prepare a large, thin clay board because the clay board is limp. Of course, it is very difficult to stack large, thin clay boards. If a clay board is, for example, 30 cm×30 cm, the thickness of the board should be at least 5 mm to facilitate stacking rendering the Nerikomi shaping process unsuitable for industrial production. As mentioned previously, the fineness of the ceramic ware pattern is determined by the thickness of the raw material clay board, with the result that ceramic ware produced by the Nerikomi shaping process does not have a fine pattern. A stripe pattern can be prepared by another method in which the shaping clay is brushed many times with sludge comprised of water and clay. This method is very time consuming and it is difficult to prepare a stripe pattern having a uniform thickness of 1 mm or more.

SUMMARY OF THE INVENTION

The object of this invention is to provide a method of producing ceramic ware bearing a fine stripe pattern using the Nerikomi shaping process, which comprises alternately stacking, after firing, at least two kinds of ceramic raw material sheets differing in color. The said sheet contains a fibrous material such as pulp and clay.

According to this invention, there is provided a method of producing a ceramic ware, comprising the steps of adding a flocculant to each of at least two different aqueous suspensions each containing a fibrous material, a ceramic raw clay and, as required, a colorant such as a ceramic picturing pigment, so as to enable the clay, or both clay and colorant, to be adsorbed on the surface of the fibrous material; preparing from the aqueous suspensions by the ordinary paper-making method at least two kinds of ceramic raw material sheets differing from each other in color after firing; performing a stacking-cutting operation of the sheets at least once, in which the different kinds of sheets are alternately stacked one upon the other, followed by mechanically cutting the stacked mass under a wet or frozen condition in a direction not parallel with the surface of the ceramic raw material sheet; forming the resultant sheet into a desired shape; and drying and subsequently firing the shaped mass.

DETAILED DESCRIPTION OF THE PREFERRED EMBODIMENTS

Figure 1:
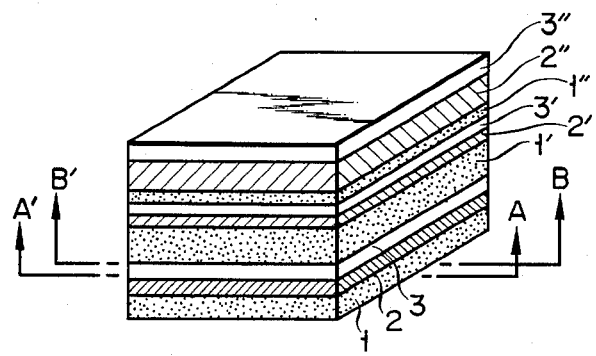
FIG. 1 is an oblique view showing an example of a stacked mass of ceramic raw material sheets.
Figure 2:
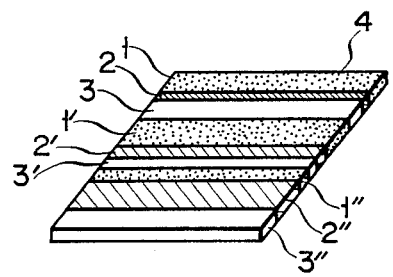
FIG. 2 is an oblique view showing a sheet cut from the stacked mass of FIG. 1 along line A-A' and B-B'.
Figure 3:
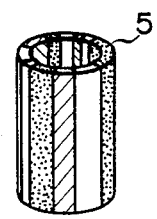
FIG. 3 is an oblique view showing an example of Nerikomi ceramic ware prepared from the sheet of FIG. 2.

FIG. 1 shows that 9 sheets of ceramic raw material are stacked one upon the other. The sheets 1, 2 and 3 differ from each other in color after firing. The sheets 1, 1' and 1" are the same in color after firing, but differ from each other in thickness. This is also the case with the sheets 2, 2' and 2" and the other sheets 3, 3' and 3". It is seen that the ceramic raw material sheets are stacked so that the adjacent sheets differ from each other in color after firing. A patterned sheet 4 as shown in FIG. 2 is obtained if the stacked mass shown in FIG. 1 is cut along lines A-A' and B-B'. FIG. 3 shows ceramic ware 5 bearing a stripe pattern, which is produced by forming the sheet 4, under a wet condition, into a cylindrical shape, followed by drying and, then, by firing the shaped mass.

In the example illustrated, the stacking-cutting operation is performed only once, with the result that the produced ceramic ware bears a stripe pattern. If the stacking-cutting operation is performed at least twice; for example, if a plurality of sheets as shown in FIG. 2 are stacked, followed by cutting the stacked sheets in a direction not parallel with the surface of the sheet, it is possible to produce ceramic ware bearing a checker pattern or other complex patterns. In general, the cutting plane is perpendicular to the surface of the sheet, though the stacked sheets may be cut in any direction as long as the cutting plane is not parallel with the surface of the sheet.

In this invention, the ceramic raw material sheet contains a fibrous material acting as a carrier, rendering it possible to prepare a large, thin raw material sheet. Also, the paper-making technique employed in this invention readily permits changing the basis weight of the raw material sheet, with the result that it is possible to prepare sheets of various thicknesses ranging between 0.2 mm and 20 mm. Thus, this invention permits producing large ceramic ware bearing a fine pattern without difficulty. Further, the presence of a fibrous material enables the cut sheet to be folded, cut, stuck, etc. easily in the shaping process, making it possible to produce ceramic ware with a thin wall. It should also be noted that, in the conventional process, much labor was required in the kneading of the raw clay mixed with a colorant in order to prepare a sheet of uniform color. In this invention, however, the nonuniformity of color can be eliminated by simply stirring sufficiently with, for example, a mixer of an aqueous suspension containing the raw clay and the colorant, before the clay particles are adsorbed on the surface of the fibrous material.

In this invention, it is desirable to add traces of a flocculant to the aqueous suspension when preparing the raw material sheet, because the flocculant enables the suspended particles of the clay, colorant, etc. to be effectively adsorbed on the fibrous material. Both inorganic flocculants and polymer flocculants can be used in this invention. The inorganic flocculants include, for example, aluminum sulfate, sodium aluminate, ferrous sulfate, ferric sulfate and ferric chloride. On the other hand, a polyacrylamide type flocculant is a typical example of a polymer flocculant, though others such as polyamine, cationic starch, polyethyleneimine and polysodium acrylate can also be used in this invention. The amount of polymer flocculant used, for producing a satisfactory adsorbing-flocculating effect, is as small as, for example, 0.01 to 0.2% of the raw clay by weight. In many cases, it suffices to use a polymer flocculant singly. However, it is desirable to use an inorganic flocculant such as aluminum sulfate together with a polyacrylamide-type polymer flocculant for further improving the adsorbing-flocculating effect. The inorganic flocculant tends to be used in larger amounts than the polymer flocculant; the amount of inorganic flocculant reaches, in some cases, as much as 0.5 to 3% of the raw clay by weight. However, no particular problem is brought about by the use of a large amount of inorganic flocculant, because the inorganic flocculant is converted into a metal oxide in the firing step, and becomes a component of the ceramic ware product. In brief, the flocculant used in this invention enables substantially all the suspended clay particles to be adsorbed on the fibrous material.

Clay available on the market as ceramic art clay can be used in this invention as the raw clay. Particularly, white clay low in iron content is advantageous in that the colorant mixed in it shows clearly. The picturing pigment, coloring glaze, etc., which are metal oxides, are used as colorants and should be substantially equal to the ceramic clay in sintering temperature. The amount of colorant, which differs depending on the kinds of clay and colorant itself, should not exceed 10% of the clay by weight. If colorant is added excessively, the stacked raw material sheets will have different shrinking rates, leading to peeling of the stacked sheets.

In order to enable the clay to be sintered in the firing step, it is necessary for the raw material sheet to contain at least 50% of the clay by weight when dry. Preferably, the clay content of the sheet should range between 90 and 98% by weight in order to enable the clay to be sintered to produce ceramic ware of certain density.

Any kind of fibrous material such as natural pulp, synthetic resin pulp or an inorganic fiber like asbestos can be used in this invention as long as the fibrous material does not pass through a paper-making net when preparing the raw material sheet. The fibrous material content of the sheet when dry should be about 2 to 50% by weight, preferably, 3 to 10% by weight. If the fibrous material content is too high, sintering of the clay is obstructed in the firing step. On the other hand, the raw material sheet can not be reinforced sufficiently if the fibrous material content is too low. It should be noted that the sheets stacked one upon the other should contain the same kinds of clay and fibrous material in order to prevent peeling of the sheet after firing.

An aqueous suspension containing the ceramic clay and the fibrous material is prepared using 5 to 20 times as much water as the weight of the total amount of clay and fibrous material. Then, the raw material sheet containing a large amount of the clay is prepared from the aqueous suspension using a filtering device or papermaking device. The resultant sheets are stacked, followed by cutting of the sheets in a direction not parallel with the surface of the sheet. Since the fibrous materials are tangled in the sheet, it is impossible to employ the conventional string-cut method in the cutting of the stacked sheets. In this invention mechanical cutting using a circular saw, a fretsaw or an ordinary saw is used. It is desirable for the stacked sheets to be 20 to 50% water by weight. It is more practical to cut the stacked sheets when frozen. If the stacked sheets are cut when wet, the saw teeth are not damaged because the sheets are somewhat soft. But, a flow of clay takes place in the cutting plane of the sheets in the direction of the saw teeth movement. In contrast, there is relatively little flow of clay if the stacked sheets are cut when frozen. It should be noted, however, that the flow of clay can be easily eliminated by lightly polishing the surface of the shaped clay with sand paper, for example, after drying the shaped material before the firing step.

The cut sheet with a stripe pattern of different colors is formed, when wet and containing 20 to 40% water by weight into the desired shapes, such as, flower vases, trays or cups, by cutting, folding, bending, sticking, etc. The shaped material, which is dried or preliminarily fired is followed by polishing or cutting of the surface of the shaped material with sand paper or a knife in such a way as to eliminate the disorder of the surface pattern. Finally, the shaped material is fired to obtain the desired ceramic ware bearing a clear surface pattern. If the shaped material is coated with a transparent glaze before firing, the produced ceramic ware bears a clearer pattern. As described previously, a highly complex decorative pattern can be obtained by changing the stacking order of the raw material sheets, the cutting direction of the stacked sheets, and the number of times stacking-cutting operation is carried out.

Where a combustible material such as natural pulp or synthetic resin pulp is used as the fibrous material, it is necessary to burn out the combustible material in a preliminarily firing the shaped material. It is desirable to perform the preliminary firing under an oxidizing atmosphere. For example, the combustible fibrous material can be burnt out at about 600 to 800° C. if the preliminary firing temperature is gradually elevated starting at room temperature and in a normal atmosphere. Finally, ordinary firing is performed; the firing temperature and atmosphere are optionally changed so as to sinter the clay.

As described in detail above, the present invention utilizes a paper-making technique for preparing the ceramic raw material sheet, rendering it possible to prepare sheets having thicknesses of, for example, 0.2 mm to 20 mm. Thus, the produced ceramic ware can have a stripe pattern or checker pattern of the desired fineness. In addition, the paper-making technique employed in this invention permits readily preparing large sheets, with the result that it is possible to produce large "Nerikomi" ceramic ware of a highly decorative nature. It should also be noted that Nerikomi ceramic ware was an object of craftwork in the past which could be produced only by craftsman having extremely high skill. However, this invention permits mass production of Nerikomi ceramic ware on an industrial basis without requiring high skill.

Described in the following are Examples of this invention. Needless to say, the scope of this invention is not restricted by the following Examples.

EXAMPLE 1

Forty-seven parts of "Joseki Soji", i.e., ceramic clay produced by Nippon Toryo K.K., was fully mixed with 300 parts of 1% pulp dispersion having a natural pulp (NUKP) dispersed and dissociated therein by a pulper so as to prepare a clay suspension, followed by adding to the suspension 1.3 parts aluminum sulfate, i.e., inorganic flocculant, and 0.05 part of "Sampoly N-500", i.e., polyacrylamide type polymer flocculant (produced by Sankyo Kasei K.K.) so as to enable the suspended clay particles to be adsorbed on the pulp surface. Then, ceramic raw material sheets A, each sized about 30 cm × 30 cm and about 2 mm thick, were prepared from the suspension by the ordinary paper-making method using a net of 50 meshes. The basis weight of the sheet A, when dried, was 2.2 kg/m².

Ceramic raw material sheets B each having a thickness of about 3 mm and a basis weight of 3.3 kg/m² when dried, were also prepared as above, except that 0.5 part of Turkey blue, i.e., ceramic art pigment, was added. Ceramic raw material sheets C each having a thickness of about 1 mm and a basis weight of 1.1 kg/m², when dried, were similarly prepared, except that 0.5 part of Indian red was added.

The ceramic raw material sheets A, B and C thus prepared were stacked in the order mentioned when the water content of the sheet was 30% by weight. The stacking was repeated 20 times so as to prepare a stacked mass consisting of 60 sheets, followed by cutting the stacked mass in a direction perpendicular to the sheet surface with a circular saw so as to prepare five striped sheets each about 30 cm × 15 cm and having a thickness of about 5 mm. These striped sheets were formed into a cylinder by cutting, folding and sticking. The cylinder thus prepared was heated under an oxidizing atmosphere to 800° C. to burn out the pulp component, followed by polishing the cylinder surface with sand paper to make the stripe pattern of the cylinder clear. Finally, the cylinder was fired at 1,280° C. to produce cylindrical ceramic ware about 25 cm high and about 20 cm in diameter. The produced ceramic ware was imparted with a pattern of stripes consisting of light brown stripes 1 mm in thickness and, white stripes 2 mm in thickness and blue stripes 3 mm in thickness.

EXAMPLE 2

Eighteen parts of "Namishigaraki", i.e., a ceramic clay produced by Nippon Toryo K.K., and 1 part "Gosu", i.e., a ceramic art pigment, were fully mixed with 200 parts of 0.5% pulp dispersion having E790, i.e., a synthetic resin pulp produced by Mitsui Zerabac K.K., dispersed and dissociated therein by a pulper so as to prepare a clay suspension, followed by adding to the suspension 1 part aluminum sulfate and 0.04 part "Sampoly N-500" so as to enable the suspended clay particles to be adsorbed on the pulp surface. Then, ceramic raw material sheets D each sized about 60 cm × 30 cm and about 2 mm thick were prepared from the suspension by the ordinary paper-making method using a net of 50 meshes. The basis weight of the sheet D, when dried, was 2.2 kg/m².

Likewise, ceramic raw material sheets E each having a thickness of about 2 mm and a basis weight of 2.2 kg/m², when dried, were also prepared as above, except that 1 part Indian red was added.

The ceramic raw material sheets D and E thus prepared were alternately stacked when the water content of the sheet was 30% by weight. The stacking was repeated 30 times to prepare a stacked mass consisting of 60 sheets. After being frozen at −3° C., the stacked mass was cut in a direction perpendicular to the sheet surface with a circular saw to prepare five striped sheets each sized about 60 cm × 13 cm and about 5 mm thick. These striped sheets were rolled into a cylinder of vortex cross section, followed by cutting the column in a direction making an angle of 45° with the side surface of the cylinder so as to obtain 9 elliptical sheets bearing a spiral pattern and each having a thickness of about 5 mm and an average diameter of about 8 cm.

A sheet about 5 cm square was cut out of each of the elliptical sheets so as to obtain 9 square sheets. These square sheets were stuck together to form a large square sheet. After drying, the surface of the large square sheet was polished with #150 sand paper to eliminate pattern disorder on the sheet surface, followed by gradually heating the sheet, starting at room temperature, for 10 hours to burn out the pulp contained in the sheet. Further, the sheet was fired at 1,250° C. for 1 hour. After coating with a glaze, the sheet was fired again at 800° C. to produce dish-like glazed ceramic ware about 13 cm square and about 5 mm thick, and bearing a clear spiral pattern.

What we claim is:

1. A method of producing patterned ceramic ware, comprising the steps of adding a polymer flocculant and an inorganic flocculant to each of at least two different aqueous suspensions each containing a fibrous material, a ceramic raw clay and, as required, a colorant such as ceramic picturing pigment, so as to enable the clay, or both clay and colorant, to be adsorbed on the surface of the fibrous material; preparing from the suspensions, by the ordinary wet paper-making method, at least two kinds of ceramic raw material wet sheets differing from each other in color after firing; performing a stacking-cutting operation at least once, in which the different kinds of the wet sheets are alternately stacked; mechanically cutting the stacked wet sheets, using a cutter selected from a circular saw, a fretsaw and an ordinary saw, in a direction not parallel with the surface of the raw material sheet when the water content of the sheets is 20 to 50% by weight; forming the resultant sheet into a desired shape; and subsequently firing the shaped mass.

2. The method according to claim 1, wherein the amount of colorant added is at most 10% of the clay by weight.

3. The method according to claim 1, wherein said flocculant comprises a combination of a polyacrylamide-type polymer flocculant and aluminum sulfate.

4. The method according to claim 1, wherein each sheet, when dried, contains 50 to 98% of the ceramic raw clay by weight.

5. the method according to claim 1, wherein each sheet, when dried, contains 2 to 50% of the fibrous material by weight.

6. A method of producing patterned ceramic ware, comprising the steps of adding a polymer flocculant and an inorganic flocculant to each of at least two different aqueous suspensions each containing a fibrous material, a ceramic raw clay and, as required, a colorant such as ceramic picturing pigment, so as to enable the clay, or both clay and colorant, to be adsorbed on the surface of the fibrous material; preparing from the suspensions, by the ordinary wet paper-making method, at least two kinds of ceramic raw material wet sheets differing from each other in color after firing; performing a stacking-cutting operation at least once, in which the different kinds of the wet sheets are alternately stacked; freezing the stacked wet sheets; mechanically cutting the frozen stacked sheets, using a cutter selected from a circular saw, a fretsaw and an ordinary saw, in a direction not parallel with the surface of the raw material sheet when the water content of the sheets is 20 to 50% by weight; forming the resultant sheet into a desired shape; and drying and subsequently firing the shaped mass.

7. The method according to claim 6, wherein the amount of colorant added is at most 10% of the clay by weight.

8. The method according to claim 6, wherein said flocculant comprises a combination of a polyacrylamide-type polymer flocculant and aluminum sulfate.

9. The method according to claim 6, wherein each sheet, when dried, contains 50 to 98% of the ceramic raw clay by weight.

10. The method according to claim 6, wherein each sheet, when dried, contains 2 to 50% of the fibrous material by weight.

11. The patterned ceramic ware produced by the method of claim 1.

* * * * *